3,042,668
MODIFIED GALACTOMANNAN GUMS AND
METHOD OF PREPARING SAME
Anthony Monti, Brooklyn, N.Y., and Nathan R. Pike, Glenville, Conn., assignors to American Molasses Company, New York, N.Y., a corporation of New York
No Drawing. Filed Dec. 2, 1960, Ser. No. 73,182
13 Claims. (Cl. 260—209)

This invention relates to modified polysaccharide gums with improved properties such as solubility, and to methods of preparing same; and more particularly to a method of modifying galactomannans such as locust bean gum, and to the resulting product.

Polysaccharides are carbohydrate polymers which are identified herein by replacing the suffix -ose in the basic sugar unit by the suffix -an, in accordance with the general recommendation of the Polysaccharide Nomenclature Subcommittee operating under the Committee on Nomenclature of the Organic Chemistry Division of the American Chemical Society.

In order to better understand the invention, it is desirable to first consider polysaccharide gums in general, and to note the differences in structure and properties between locust bean gum and other gums.

The term gum, as technically employed in industry, refers to plant polysaccharides, or their derivatives, which are dispersible in either hot or cold water to produce viscous mixtures, colloidal solutions or gels. Gums are therefore commercially important in that they impart viscosity to such aqueous solutions.

In this specification, where reference is made to "solution," "dissolves," "sols" and words of similar import, it will be understood these expressions are used in the commonly accepted sense in this art to include the formation of colloidal solutions in which the gum particles of colloidal size are uniformly suspended in the water.

Polysaccharide gums are commonly used in food products and other industries as stabilizers and thickeners. They form viscous solutions, and in some cases, gels, which prevent aggregation of the small particles of the dispersed phase.

Gums have been classified generally as to their source and structure. Among the various sources of commercial gums are: seaweeds, plant exudates, plant extracts, and plant seeds.

The physical properties of gums are manifestations of their chemical structure, the kind and amount of solvent, and the kind and concentration of ions and other substances dissolved in the solvent. Because various gums are commonly composed of several different kinds of monomer units with many possible variations in regard to degree of branching, length of branches, and types of linkages, an almost infinite number of structures is possible. Forces act between molecules, between different parts of the same molecule, and between polymer and solvent. These forces include hydrogen bonding, ionic charges, dipole and induced dipole interactions, and van der Waals forces. All of these forces affect such properties as sol-forming or gel-forming tendency, viscosity, and adhesiveness.

Table I shows a list of several known raw seaweed and plant seed polysaccharide gums, their sources in nature, the sugar units, and the most prevalent glycosidic linkage.

TABLE I

| Gum | Source | Sugars present and linkages |
|---|---|---|
| Seaweed Gums: | | |
| Agar | Red algae (Gelidium sp.). | D-galactose β-(1→4), 3,6-anhydro-L-galactose α-(1→3), + sulfate acid ester groups. |
| Carrageenin | Red algae (Chondrus crispus) (Gigartina stellata). | D-galactose, 3, 6-anhydro-D-galactose + sulfate acid ester groups. |
| Plant Seed Gums— Locust bean. | Carob tree (Ceratonia siliqua) endosperm. | D-mannose β-(1→4), D-galactose α-(1→6) branches. |

All polysaccharide molecules are hydrophilic, i.e. in the presence of water they combine with water molecules to bring about a partial immobilization of the near molecules. If the polysaccharide molecule dissolves, the surrounding atmosphere of water molecules is carried with it. Thus, the polysaccharide molecule in solution will appear to occupy a larger space due to its apparent enlarged diameter. This large space requirement means that, at very low concentrations, the extended polysaccharide molecules will come into contact with each other and give the solution a significant viscosity which will increase rapidly with concentration.

Linear polysaccharides will occupy more space and, therefore, show greater viscosity than highly branched polysaccharides of equal molecular weight. Some polysaccharides, such as locust bean gum, are long chains with numerous very short branches. These molecules have many of the properties of both linear and highly branched molecules. Locust bean gum is a long chain of D-mannose units with an average of one D-galactopyranose branch on every other D-mannopyranose unit. As a long linear-like polysaccharide, its solutions are highly viscous. However, the D-galactose side groups fend off other colliding molecules and prevent the associative lining up of molecules as would occur in solutions of purely linear molecules. Therefore, solutions of locust bean gum are quite stable.

The colloidal properties of gums in an appropriate solvent or swelling agent make them capable of producing gels or sols at low dry-substance content. A "sol," such as is produced, for example, by locust bean gum, is a dispersion of colloidal particles (internal phase) in a liquid (external phase). These colloidal particles do not adhere to each other but increase the viscosity of the whole by adhering to the molecules of the external phase, thus producing larger units which increase resistance to flow. A "gel," on the other hand, such as is produced by agar or carageen gums, starts out as a sol, but upon cooling to gelling temperature there occurs a reversal of phases in which the internal phase becomes the external phase, and vice versa. In this reversal, micelles of the agar or carageen are held together by intermicellular forces, but do not actually touch each other, due to separation by the adsorbed molecules of the liquid, e.g. water. A rigid structure is thus formed in which water molecules are held between adjacent micelles and also in spaces formed by the gel framework.

Gels and stable sols are produced by different polysaccharides having different molecular structures, and impart to the product in which they are used different properties. For example, in our copending patent application Serial No. 774,128, filed November 17, 1958, now Patent No. 2,963,373, entitled "Icings and Method of Preparing Them and Cold-Water Soluble Agar and Carrageen Gums for Said Icings," there is described a method for producing a modified seaweed gum such as from agar or carrageen by mixing a water-carrier additive and water with the gum, heating the mixture to a temperature of from 170° F. to 350° F. to dissolve the ingredients, drying the resultant solution and then drying the product. That application further describes the preparation of food products such as icings from the modified agar or carrageen gum so produced. It is the particular gelling properties of such gums which make them most suitable for icings. However, gums such as locust bean gum which form stable sols are not particularly suitable for icings since, although of high viscosity, the sols still remain essentially liquid with the property of seeking their own level. Sols tend to be of a stringy and sticky nature. Thus, although these properties of sols are not desirable in icings they are particularly useful in other food and non-food products. For example, locust bean gum, because of its stable sol-forming properties is used in salad dressing preparations to keep particles of spices in suspension, and to overcome the tendency of the particles to settle out. The thickening action of a locust bean gum sol is very effective in such applications. The water in a sol is also held quite tenaciously. Thus, in products such as ice cream or cream cheese, the use of a locust bean gum sol serves to prevent weeping, or bleeding, of moisture. A gel, such as is produced from agar or carrageen, is useful in icings because of its rigid structure which resists flow and thereby keeps the icing in place, while also acting to tie up and retain the moisture. A gel lacks the stringiness of a sol and gives a clean cut or bite to an icing formulation. This rigid structure of gels would be unsatisfactory for use in a salad dressing preparation, since particles of the gel would be apparent even though vigorous agitation might be employed.

Gums which tend to form gels may be mixed together with those which tend to form stable sols so that they modify each other for producing some particular desired effect in a final product, each gum contributing its own specific useful properties.

Locust bean gum, to which the method of the present invention is particularly applicable, is extracted from the seed pods of a leguminous plant, *Ceratonia siliqua*, or Carob tree, grown in the Mediterranean area. The locust bean, or carob fruit is also known as St. John's bread, and the Locust bean gum is derived from the white transparent endosperm layer which surrounds the central hard, yellow embryo of the kernel of its seed. Locust bean gum is also marketed under other names which include Carob (seed) gum, gum Gatto, gum Hevo, Jandagum, Lakoe gum, Rubigum, Lupogum, Luposol, gum Tragon, Tragarab, and Tragasol.

Locust bean gum is widely used as a thickener and stabilizing agent in the preparation of many different products by reason of its ability to absorb and retain water in a sol, i.e. in a colloidal solution of high viscosity. It is used in such food products as: cream cheese, cheese spreads, ice cream, baked goods; in meat products such as salami, bologna and other sausages; in canned meats and fish; and in sauces and salad dressings. Non-food uses include pharmaceutical jellies, textile and paper sizes, adhesives and oil well drilling muds.

One of the difficulties in using locust bean gum is that when it is mixed with cold water, or water at room temperature, it forms an incomplete dispersion. Even on long standing, it fails to develop its maximum viscosity, and part of the gum remains as an insoluble floc which gradually settles out. In order to completely disperse the gum in a permanent state of colloidal solution, i.e. to form a locust bean sol, and thereby develop its maximum properties, such as viscosity and stabilizing power, it has heretofore been necessary to heat the gum-water mixture to about 180° F. for about 5 minutes. This necessity for heating or cooking locust bean gum in water to achieve its maximum viscosity, and the time required for doing so, has prevented, or inhibited, utilization of locust bean gum in various products where its desirable properties could be beneficial. In other products where locust bean gum is already in use, a more readily soluble form of the gum would be advantageous in making the dissolving operation more efficient and less time consuming.

It is therefore an object of the present invention to provide a method for producing a dry base for a modified galactomannan sol which can develop its maximum properties of viscosity and stabilizing power without the necessity for first heating the dry material in water to an elevated temperature.

It is another object of the invention to provide a modified locust bean gum and a method for producing same which will develop the maximum viscosity of the gum upon being mixed with water at room temperature of about 70° F. without any necessity of applying heat thereto, and which will develop this maximum viscosity in a relatively short period of time.

It is a further object of the invention to provide a modified locust bean gum and a method for producing same which will develop a viscosity at least equal to or better than those of sols produced by cooking natural locust bean gum in water. To achieve these ends, and in accordance with the invention, locust bean gum is mixed with water in the ratio of approximately 25 to 100 parts by weight of water per part of gum. To this mixture is added a water-carrying or gelatinizing additive, hereinafter further described, in an amount of from 1 part to 100 parts by weight per part of gum. The resultant mixture is then heated to a temperature of from about 140° to about 180° F. for a period from about 1 hour to as short as 5 minutes, respectively, depending upon the temperature, to produce a solution which is thereafter dried. The dried product is then cooled and the cooled product is pulverized to produce, surprisingly and unexpectedly, a modified locust bean gum which when added to water at room temperature produces a solution which reasonably promptly forms a highly viscous and stable colloidal sol, satisfactory for thickening and stabilizing purposes in all applications where a sol made by cooking natural locust bean gum can be used.

Within the temperature ranges above mentioned, the longer the heating time the lower the temperature; conversely, the higher the temperature the shorter the heating time. Also, in general, the greater the amount of additive employed, the longer will be the heating time; and with larger amounts of the additives within the above given ranges, higher temperatures and longer heating times are required as compared with the compositions prepared using smaller amounts of additives.

The water-carrying or gelatinizing additives are preferably sugar, employed in amounts of from 2 to 100 parts by weight per part of gum, optimum results being obtained within this range with 24 parts per part of gum; flour (tapioca, wheat, sago, rye or other baking flour) employed in amounts of from 1 to 10 parts by weight of flour per part of gum, preferably 3 parts of flour per part of gum; and mixtures of sugar and flour, using from 1 to 100 parts by weight of sugar and 1 to 10 parts by weight of flour per part of gum, preferably 3 parts of sugar and 3 parts of flour per part of gum. Other additives which have been found effective are inorganic salts such as calcium sulphate and tri-calcium phosphate, each employed in amounts of from 1 to 50 parts by weight per part of gum, preferably 25 parts per part of gum.

The water-carrying or gelatinizing additive may be added to the water-gum mixture all at one time or in increments. Optimum results are obtained by heating the gum and water preferably to boiling and adding the water-carrying additive increments with sufficient time intervals between additions to allow for equalization of solute concentration inside and outside each particle of gum. The presence of the additive during the drying causes the gum particles to remain extended, permitting easy penetration of, and contributing to the solubility of the modified gum in water at room temperature.

The mixture of gum, water and additive in the proportion of 25 to 100 parts by weight of water per part of gum, and employing an amount of additive near the minimum amount in the range above given, is heated to a temperature of 140° F., preferably to its boiling point, to produce the solution which is later dried. When employing amounts of additive near the maximum amount within the ranges above given, the resultant mixture may be heated to a temperature as high as 180° F. The time of heat treatment of mixtures containing minimum or amounts near minimum of the additive is preferably about 1 hour when a temperature of about 140° F. is employed. As the temperature employed is increased, the time required decreases, as for example, when heated to a temperature of 180° F., the time required is five minutes. As the amounts of additive are increased above the minimum, the time required decreases for corresponding temperatures. For example, using the preferred amounts of additive as above indicated, the time required for a temperature of 140° F. is approximately 30 minutes.

The resultant solution is dried in any known manner. For example, the solution may be drum-dried in any suitable fashion, may be sun-dried, spray-dried, or dried by conventional pan-drying techniques. As indicated, the dried product is pulverized to produce the final product which, surprisingly, when added to water at room temperature, forms a colloidal solution or sol which remains stable and which is eminently satisfactory for use for thickening and stabilizing purposes in all applications where a sol made by cooking natural locust bean gum can be used.

The modified locust bean gum may be used alone or mixed with other gums or ingredients to achieve any desired combination of properties in a manner similar to mixtures with a sol made by cooking natural locust bean gum.

The explanation of the change which takes place to make the modified gum capable of dissolving in water at room temperature, or at even a lower temperature (i.e. from about 5° C. to 25° C.), without the need for cooking, is not fully understood. It is believed that the pretreatment hereinabove described expands the locust bean gum particles, causing them to be penetrated by the additive particles. When the pulverized final product is added to the water, the additive particles may provide passageways along which water can penetrate readily into the gum particles and cause them to go into colloidal solution. It will be understood that this invention is not to be limited to the above explanation, which is advanced to facilitate a better understanding of the invention.

The pulverized product or dry base is added to water in the ratio of from 1 to 100 parts by weight of water per part of modified gum. The exact amount of water used will depend on the desired consistency of the sol. This addition is performed by the formulator when producing his end product to be stabilized or thickened by the inventive modified gum, as hereinabove described.

Examples in the production of modified gums according to the invention, which can be used as a thickening or stabilizing agent are as follows:

*Example I*

1 pound of locust bean gum and 2 pounds of sugar were thoroughly mixed and added to 100 pounds of water. The resultant mixture was heated to 180° F., producing a colloidal solution which was passed over a drum drier to produce a product having a moisture content of less than 1%. The resultant modified locust bean gum was then pulverized. The pulverized product, when added to water at room temperature of about 70° F., promptly resulted in an excellent locust bean gum sol.

*Example II*

1 pound of locust bean gum and 25 pounds of sugar were thoroughly mixed and added to 100 pounds of water. The resultant mixture was heated to 180° F., producing a colloidal solution which was passed over a drum drier to produce a product having a moisture content of less than 1%. The resultant modified locust bean gum was then pulverized. The pulverized product, when added to water at room temperature of about 70° F., promptly resulted in an excellent locust bean gum sol.

*Example III*

1 pound of locust bean gum and 99 pounds of sugar were thoroughly mixed and added to 125 pounds of water. The resultant mixture was then heated to 180° F., producing a colloidal solution which was passed over a drum drier to produce a product having a moisture content of less than 1%. The resultant modified locust bean gum was then pulverized. The pulverized product, when added to water at room temperature of about 70° F., promptly resulted in an excellent locust bean gum sol.

*Example IV*

1 pound of locust bean gum and 3 pounds of tapioca flour were mixed with 120 pounds of water, heated to 180° F. and dried on a drum drier to less than 1% moisture. The dried product was cooled and pulverized. When added to water at room temperature of approximately 70° F., the pulverized product promptly formed an excellent locust bean gum sol.

*Example V*

1 pound of locust bean gum was thoroughly mixed with 3 pounds of sugar, 3 pounds of tapioca flour and 150 pounds of water. The mixture was heated to 180° F., dried on a drum drier, cooled and pulverized. Upon the addition of the pulverized product to water at room temperature of about 70° F., an excellent locust bean gum sol promptly resulted.

*Example VI*

1 pound of locust bean gum was mixed with 6.5 pounds of calcium sulphate and 75 pounds of water, heated to 180° F., dried on a drum drier, cooled and pulverized. Upon addition of the pulverized product to water at room temperature, an excellent locust bean gum sol promptly resulted.

*Example VII*

1 pound of locust bean gum was mixed with 1 pound of tri-calcium phosphate and 135 pounds of water, heated to 180° F., dried on a drum drier, cooled and pulverized. Upon addition of the pulverized product to water at room temperature, an excellent locust bean gum sol promptly resulted.

In this specification and claims, parts and percentages are given on a weight basis.

It will be obvious to those skilled in the art, upon a study of this disclosure, that our invention permits of various modifications and alterations with respect to the individual ingredients of the disclosed compositions and the method steps employed, and hence can be embodied in examples other than those herein chosen for the purposes of the disclosure, without departing from the essential features of our invention and within the scope of the claims annexed hereto.

This application is a continuation-in-part of copending application, Serial No. 774,128, filed November 17, 1958, by Anthony Monti and Nathan R. Pike, now Patent No. 2,963,373.

Having thus described our invention, what we claim and desire to secure by Letters Patent is:

1. A modified polysaccharide gum produced by mixing locust bean gum with water in an amount of from 25 to 100 parts water per part of gum and with an additive from the group consisting of sugar, flour, mixtures of sugar and flour, calcium sulphate and tricalcium phosphate, in amounts of from 1 to 100 parts of said additive per part of gum, heating the mixture of water, gum and additive to a temperature of at least 140° F. and thereby producing a solution in which the gum is in a state of colloidal dispersion, drying the resultant dispersion and pulverizing the dried product to produce said modified gum.

2. A modified polysaccharide gum produced by mixing locust bean gum with water in an amount from 25 to 100 parts by weight of water per part of gum with 2 to 200 parts of sugar per part of gum, heating the mixture of water, gum and additive to a temperature between 140° F. and 180° F. to thereby produce a solution in which the gum is in a state of colloidal dispersion, drying the resultant dispersion and pulverizing the dried product.

3. A modified polysaccharide gum produced by mixing locust bean gum with water in the proportions of one part of said gum to from about 25 to 100 parts by weight of water, mixing this mixture with from about one to 10 parts of tapioca flour and from about one to 100 parts cane sugar, heating the resultant mixture of water, gum, flour and sugar to a temperature of about 180° F. to thereby produce a solution in which the gum is in a state of colloidal dispersion, drying the resultant dispersion and pulverizing the dried product.

4. A modified polysaccharide gum produced by mixing locust bean gum with water in an amount of from 25 to 100 parts by weight of water per part of gum and with about 3 parts cane sugar and 3 parts tapioca flour by weight per part of gum, heating the mixture of water, gum, sugar and flour to about 180° F. to thereby produce a solution in which the gum is in a state of colloidal dispersion, drying the resultant hot solution and pulverizing the dried product.

5. A process of producing a modified polysaccharide gum from locust bean gum, which comprises mixing approximately 24 parts of sugar by weight with 1 part of said gum and from 25 to 100 parts by weight of water, heating the resultant mixture of gum, sugar and water at about 180° F. until a solution forms in which the gum is in a state of colloidal dispersion, drying the solution to a moisture content of less than 1%, cooling the dried product and pulverizing the cooled product.

6. A process of producing a modified polysaccharide gum from locust bean gum, which comprises mixing 3 parts by weight of flour by weight with 1 part of said gum and from 25 to 100 parts by weight of water, heating the resultant mixture of gum, flour and water at about 180° F. until a solution forms in which the gum is in a state of colloidal dispersion, drying the solution to a moisture content of less than 1%, cooling the dried product and pulverizing the cooled product.

7. A process of producing a modified polysaccharide gum from locust bean gum, which comprises mixing 3 parts of cane sugar and 3 parts of flour by weight with 1 part of said gum and from 25 to 100 parts by weight of water, heating the resultant mixture of gum, sugar, flour and water at about 180° F. until a solution forms in which the gum is in a state of colloidal dispersion, drying the solution to a moisture content of less than 1%, cooling the dried product and pulverizing the cooled product.

8. A process of producing a modified polysaccharide gum from locust bean gum, which comprises mixing 25 parts calcium sulphate by weight with 1 part of said gum and from 25 to 100 parts by weight of water, heating the resultant mixture of calcium sulphate, gum and water at about 180° F. until a solution forms in which the gum is in a state of colloidal dispersion, drying the solution to a moisture content of less than 1%, cooling the dried product and pulverizing the cooled product.

9. A process of producing a modified polysaccharide gum from locust bean gum, which comprises mixing 25 parts tri-calcium phosphate by weight with 1 part of said gum and from 25 to 100 parts by weight of water, heating the resultant mixture of tri-calcium phosphate, gum and water at about 180° F. until a solution forms in which the gum is in a state of colloidal dispersion, drying the solution to a moisture content of less than 1%, cooling the dried product and pulverizing the cooled product.

10. A process of producing a modified polysaccharide gum capable of readily forming a sol upon addition to water at a temperature of about 70° F., which process comprises mixing a galactomannan gum with water and a water-carrier additive in an amount of from 25 to 100 parts by weight of water and one to 100 parts of said additive per part of gum, heating the resultant mixture to a temperature of from 140° F. to 180° F. for from 5 minutes to one hour to thereby produce a solution in which the gum is in a state of colloidal dispersion, employing shorter heating times within said range when heating at higher temperatures and longer heating times within said range when heating at lower temperatures, drying the resultant colloidal solution to a moisture content less than 1% and pulverizing the dried product, said additive being from the group consisting of sugar, flour, mixture of sugar and flour, calcium sulphate and tri-calcium phosphate.

11. A process of producing a modified polysaccharide gum capable of readily forming a sol upon addition to water at a temperature of about 70° F., which process comprises mixing a galactomannan gum with water and a water-carrier additive in an amount of from 25 to 100 parts by weight of water and one to 100 parts of said additive per part of gum, heating the resultant mixture to a temperature of from 140° F. to 180° F. for from 5 minutes to one hour to thereby produce a solution in which the gum is in a state of colloidal dispersion, employing shorter heating times within said range when heating at higher temperatures and longer heating times within said range when heating at lower temperatures, drying the resultant colloidal solution to a moisture content less than 1% and pulverizing the dried product, said water-carrier additive being calcium sulphate.

12. A process of producing a modified polysaccharide capable of readily forming a sol upon addition to water at a temperature of about 70° F., which process comprises mixing a galactomannan gum with water and water-carrier additive in an amount of from 25 to 100 parts by weight of water and one to 100 parts of said additive per part of gum, heating the resultant mixture to a temperature of from 140° F. to 180° F. for from 5 minutes to one hour to thereby produce a solution in which the gum is in a state of colloidal dispersion, employing shorter heating times within said range when heating at higher temperatures and longer heating times within said range when heating at lower temperatures, drying the resultant colloidal solution to a moisture content less than 1% and pulverizing the dried product, said water-carrier additive being tri-calcium phosphate.

13. A process of producing a modified polysaccharide gum capable of readily forming a sol upon addition to water at a temperature of about 70° F., which process comprises mixing a galactomannan gum with water and a water-carrier additive in an amount of from 25 to 100 parts by weight of water and one to 100 parts of said additive per part of gum, heating the resultant mixture to a temperature of from 140° F. to 180° F. for from 5 minutes to one hour to thereby produce a solution in which the gum is in a state of colloidal dispersion, employing shorter heating times within said range when heating at higher temperatures and longer heating times within said range when heating at lower temperatures, drying the resultant colloidal solution to a moisture content less than 1% and pulverizing the dried product, said water-carrier additive being flour.

References Cited in the file of this patent

UNITED STATES PATENTS

| | | |
|---|---|---|
| 2,644,765 | Frisch et al. | July 7, 1953 |
| 2,662,882 | Christianson et al. | Dec. 15, 1953 |

OTHER REFERENCES

Walder: "Food," vol. 18, January 1949, pp. 4–6, article entitled "The Polysaccharides," part II.